US005566056A

United States Patent [19]

Chaudhry

[11] Patent Number: 5,566,056

[45] Date of Patent: Oct. 15, 1996

[54] COAXIAL TRANSMISSION LINE SURGE ARRESTOR

[75] Inventor: Nisar A. Chaudhry, West Babylon, N.Y.

[73] Assignee: TII Industries, Inc., Copiague, N.Y.

[21] Appl. No.: 351,667

[22] Filed: Dec. 8, 1994

Related U.S. Application Data

[63] Continuation-in-part of Ser. No. 192,343, Feb. 7, 1994, abandoned.

[51] Int. Cl.[6] .......... H02H 1/00

[52] U.S. Cl. .......... 361/117; 361/56; 361/91; 361/111; 361/120

[58] Field of Search .......... 361/56, 91, 111, 361/118, 119, 120, 124, 117

[56] References Cited

U.S. PATENT DOCUMENTS

| | | | |
|---|---|---|---|
| 978,959 | 12/1910 | Thomas | 361/118 |
| 2,237,426 | 4/1941 | Grassnick et al. | 361/119 |
| 2,339,663 | 1/1944 | Teare | 175/41 |
| 2,395,991 | 3/1946 | Chilcot et al. | 361/118 |
| 2,620,453 | 12/1952 | Beese et al. | 361/118 |
| 3,140,416 | 7/1964 | Sleeper | 361/118 |
| 3,274,447 | 9/1966 | Nelson | 361/119 |
| 4,035,693 | 7/1977 | Luxa et al. | 361/120 |
| 4,051,546 | 9/1977 | Scheithauer | 361/124 |
| 4,103,291 | 7/1978 | Howe et al. | 340/522 |
| 4,319,300 | 3/1982 | Napiorkowski et al. | 361/119 |
| 4,359,764 | 11/1982 | Block | 361/119 |
| 4,394,704 | 7/1983 | Jones | 361/119 |
| 4,409,637 | 10/1983 | Block | 361/119 |
| 4,437,845 | 3/1984 | Schleimann-Jensen | 445/39 |
| 4,495,539 | 1/1985 | Cook | 361/124 |
| 4,509,090 | 4/1985 | Kawanami et al. | 361/119 |
| 4,544,984 | 10/1985 | Kawanami et al. | 361/119 |
| 4,578,733 | 3/1986 | Shigemori et al. | 361/120 |
| 4,633,359 | 12/1986 | Mickelson et al. | 361/119 |
| 4,866,562 | 9/1989 | Jones | 361/119 |
| 5,050,033 | 9/1991 | Pagiluca | 361/119 |
| 5.088,937 | 2/1992 | Gabany | 439/581 |
| 5,210,677 | 5/1993 | Smith | 361/119 |
| 5,224,012 | 6/1993 | Smith | 361/119 |
| 5,282,109 | 1/1994 | Smith | 361/119 |
| 5,384,679 | 1/1995 | Smith | 361/119 |

FOREIGN PATENT DOCUMENTS

| | | | |
|---|---|---|---|
| 28894 | 5/1914 | Belgium | H02H 9/00 |
| 3212684A1 | 10/1983 | Germany | H01T 17/12 |
| 2083945A | 3/1982 | United Kingdom | H01J 17/40 |

*Primary Examiner*—Jeffrey A. Gaffin
*Assistant Examiner*—Stephen Jackson
*Attorney, Agent, or Firm*—Morgan & Finnegan

[57] ABSTRACT

A coaxial transmission line surge arrestor comprising a hollow conductive body having coaxial connectors mounted thereon and a gas discharge tube located inside the hollow metal body, the gas discharge tube having a hollow conductive housing and a center conductor having an axis parallel to the direction of signal transmission, the diameter of the center conductor being dimensioned for matching the impedance of the surge arrestor to that of the transmission line, the RF signal flowing through said gas discharge tube.

95 Claims, 8 Drawing Sheets

COAXIAL TRANSMISSION LINE SURGE ARRESTOR

CROSS-REFERENCE TO RELATED APPLICATIONS

This application is a continuation in part of application Ser. No. 08/192,343 filed Feb. 7, 1994 now abandoned.

BACKGROUND OF THE INVENTION

1. Field of the Invention

The present invention relates to surge arrestors and, more particularly, to gas discharge tube surge arrestors for coaxial transmission lines.

2. Discussion of the Relevant Art

Numerous gas discharge tube surge arrestors have been developed over the years for protecting telephone lines from overvoltage conditions caused, for example, by lightning or fallen high voltage power lines. Such conventional surge arrestors, while suitable for telephone lines, are unsuitable for coaxial transmission lines which have unique characteristics and requirements. Several attempts have, however, been made to provide gas discharge tube surge arrestors for coaxial transmission lines.

Kawanami U.S. Pat. No. 4,544,984 issued Oct. 1, 1985 (Kawanami '984) discloses a gas discharge tube surge arrestor for a coaxial transmission line. According to the Kawanami '984 patent, conventional gas discharge tubes, while suitable as surge arrestors for telephone lines, cannot be used for high frequency coaxial transmission lines because (1) the gas discharge tube has a considerable amount of capacitance and (2) the nature of the required connection is such that it greatly changes the impedance of the coaxial transmission line and causes reflections in the transmission line. According to the Kawanami '984 patent, there has previously been no surge arrestor which could be used in a high frequency coaxial transmission line (column 1, line 57 to column 2, line 4).

The Kawanami '984 patent discloses a surge arrestor which connects a gas discharge tube between the inner and outer conductors of the coaxial transmission line in a direction orthogonal to the direction of signal transmission. The unwanted increased capacitance associated with the use of a gas discharge tube in a coaxial transmission line is compensated for by reducing the effective cross sectional area of the inner conductor at the place where the gas tube contacts the inner conductor by cutting out a portion of the center conductor to create a flat area on which the gas tube rests.

Kawanami U.S. Pat. No. 4,509,090 issued on Apr. 2, 1985 (Kawanami '090) also explains why conventional gas discharge tubes have not been successfully employed as surge arrestors in coaxial transmission lines and discloses the same type of structure disclosed in the Kawanami '984 patent, i.e., a device which connects the gas discharge tube between the inner and outer conductors of the coaxial transmission line in a direction orthogonal to the direction of signal transmission. In FIG. 7 the Kawanami '090 patent provides information concerning the impact of reducing the effective cross sectional area of the center conductor at the place where it contacts the gas discharge tube, showing that small dimensional changes on the order of 1 or 2 millimeters have a significant effect on the voltage standing wave ratio (VSWR).

Mickelson U.S. Pat. No. 4,633,359 issued on Dec. 30, 1986 also discloses a surge arrestor for a coaxial transmission line in which a gas discharge tube is connected between the inner and outer conductors of the transmission line in a direction orthogonal to the direction of signal transmission. The asserted advantage of the Mickelson device is that it is "simpler and less expensive to fabricate." Like the Kawanami '090 and '984 patents, Mickelson uses a center conductor which is flattened at the place where the gas tube contacts the center conductor. In addition to serving as a seat for the gas tube, this flat area adjusts the inductance of the center conductor to compensate for the distributed capacitance of the gas tube. Chamfers are provided adjacent the flat area to match the impedance of the surge arrestor to that of the transmission line. It is well known that maximum power transfer occurs when matched impedances are employed.

The present invention provides a new and improved surge arrestor for coaxial transmission lines in which the axis of the gas discharge tube is oriented parallel to the direction of signal transmission, rather than orthogonal to the direction of signal transmission as disclosed in the prior art, and the RF signal flows through the gas discharge tube. The coaxial surge arrestor of the present invention is sufficiently small that it can be incorporated within or made an integral part of existing coaxial connectors. Further, the present invention results in a much simpler, easier to manufacture and, therefore, less expensive device. At the same time, the present invention permits compensating for the unwanted capacitance introduced by the presence of a gas discharge tube in the coaxial transmission line and further permits matching the impedance of the surge arrestor to that of the coaxial transmission line so as to provide a device having a useful frequency range extending from 50 MHz to at least 1 GHz.

Therefore, it is an object of the present invention to provide a coaxial surge arrestor which has a characteristic impedance similar to that of the coaxial transmission line.

It is another object of the present invention to provide a coaxial surge arrestor which permits compensating for the unwanted capacitance introduced by the use of a gas discharge tube in a coaxial transmission line.

It is another object of the present invention to provide a coaxial surge arrestor which may be mounted within conventional coaxial cable components and which may be readily installed in existing coaxial transmission lines.

It is another object of the present invention to provide a gas discharge tube suitable for use in a coaxial surge arrestor.

It is another object of the present invention to provide a coaxial surge arrestor in which the RF signal flows through the gas discharge tube.

It is another object of the present invention to provide an economically constructed coaxial surge arrestor which includes fail safe protection so that overheating of the gas discharge tube will short the communication line to ground, thereby protecting the equipment to which it is connected.

It is still another object of the present invention to provide a coaxial surge arrestor which includes current limiting and/or low voltage protection.

SUMMARY OF THE INVENTION

A coaxial transmission line surge arrestor according to the principles of the present invention comprises a hollow conductive body having coaxial connectors mounted thereon. A gas discharge tube is located in or forms an integral part of the conductive body. The RF signal passes through the gas discharge tube. The gas discharge tube comprises a hollow conductive housing having insulating ends which seal the housing and maintain an inert gas within the housing. A center conductor extends axially through the conductive housing in the direction of signal transmission. The insulating ends may be ceramic and the portions of the ceramic ends contacting the conductive housing and the central conductor may be metallized. At least a portion of the inner surface of the conductive housing and at least a portion of the outer surface the center conductor may be roughened to concentrate the electric fields and provide reliable operation of the gas discharge tube. Matching the impedance of the coaxial surge arrestor to that of the coaxial transmission line may be effected by varying the ratio of the inner diameter of the conductive housing to the outer diameter of the center conductor along the length of the center conductor and by varying the length of the active gas discharge region of the device. The gas discharge tube may be fitted with a fail-safe mechanism employing a thermally sensitive electrical insulation which results in grounding of the transmission line if the gas discharge tube overheats. In addition, the coaxial surge arrestor of the present invention may incorporate current limiting and/or low voltage protection.

The subject matter which I regard as my invention is particularly pointed out in the claims at the end of the specification. My invention, including its method of operation and its numerous advantages, may best be understood by reference to the following description taken in connection with the accompanying drawings wherein like reference characters refer to like components.

BRIEF DESCRIPTION OF THE DRAWING

In order that the invention may be more fully understood, it will now be described, by way of non-limiting examples, with reference to the accompanying drawings, in which.

DESCRIPTION OF THE PREFERRED EMBODIMENTS

Figure 1:
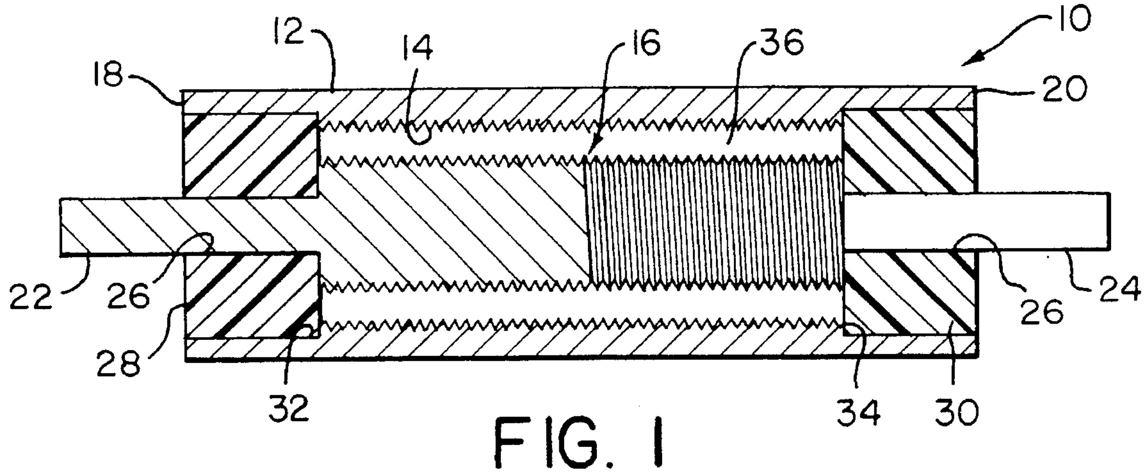
FIG. 1 is a cross-sectional view taken along the longitudinal axis of one embodiment of a gas discharge tube according to the principles of the present invention.
Figure 2:
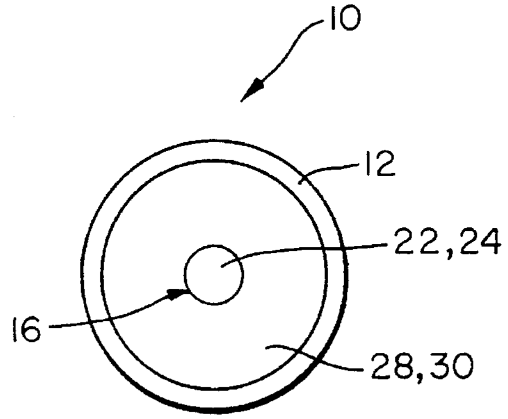
FIG. 2 is an end view in elevation of the device shown in FIG. 1.

Referring now to FIGS. 1 and 2, there is shown a gas discharge tube 10, according to the principles of the present invention, which has an elongated hollow enclosure 12 that is cylindrically shaped and made of electrically conductive material. The inner circumferential wall 14 is preferably roughened for more reliable performance, as shown by the thread-like serrations in FIG. 1, which concentrate the electric field in the discharge gap. An elongated electrically conductive electrode 16 extends from one end 18 to the other end 20 of enclosure 12.

Electrode 16 is provided with outwardly extending portions 22 and 24 which extend beyond the ends 18 and 20 of the enclosure 12 and are centrally disposed within apertures 26 provided in ceramic (nonconducting) sealing members 28 and 30 inserted in the ends 18 and 20 of the enclosure 12. Ledges 32 and 34 are provided proximate the ends 18 and 20 within the enclosure 12 so that the sealing members 28 and 30 may be accurately seated therein. The electrode 16 is also roughened along its outer circumference, as shown by the serrations in FIG. 1, in order to provide reliable firing of the gas discharge tube. Once the pieces of the gas discharge tube described above are assembled, the unit is fired in a conventional manner to allow a complete sealing of the gas 36 within the enclosure 12. The gas 36 utilized is inert and typical of that used in conventional overvoltage breakover tubes.

Figure 3:
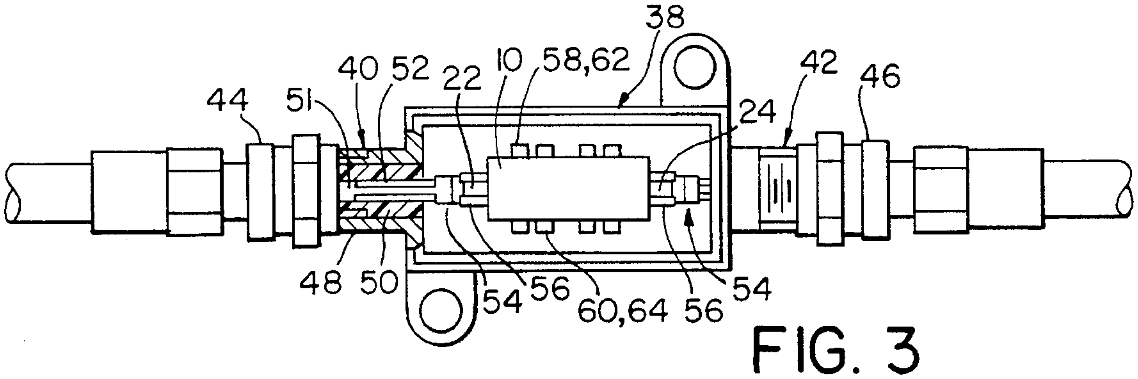
FIG. 3 is a top plan view with the cover removed, partially broken away, of a gas discharge tube inserted within a housing having a pair of coaxial connectors affixed thereto.
Figure 4:
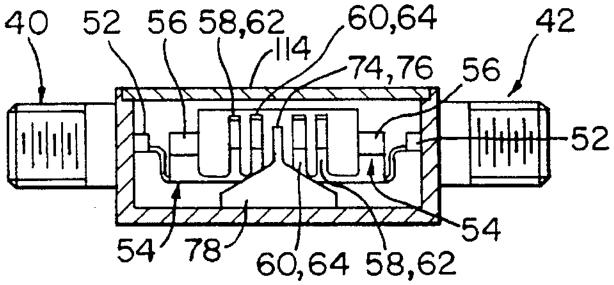
FIG. 4 is a side view in elevation, partially broken away, of the housing shown with the gas discharge tube disposed therein.

FIG. 3 shows a conductive housing 38 into which is placed the gas discharge tube 10 in a manner which will be explained hereinafter. Housing 38 includes threaded input and output connectors 40 and 42 which are adapted to receive conventional threaded F-type coaxial connectors 44 and 46, although other conventional coaxial connectors such as BNC connectors may be employed. The coaxial connectors are aligned in the direction of transmission. Each male connector includes a threaded outer shell 48 and an insulating portion 50 having a centrally disposed conductor 51 that is inserted into receptacle portion 52 of clip 54 shown in more detail in FIG. 6.

Clip 54 has a second receptacle portion 56 adapted to receive and removably hold therein the extending portions 22 and 24 of gas discharge tube 10. Clip 54 also has a plurality of fingers 58, 60, 62 and 64, which are curved and adapted to receive gas discharge tube 10 therein.

In order to insure the isolation of the conducting electrode 16 of gas discharge tube 10 so that it is not in electrically conductive contact with the clip 54, a thermally sensitive material 66 known as FEP is placed between the base portion 68 of clip 54 so that it extends over the fingers 58, 60, 62 and 64 to prevent electrically conductive contact with the metallic enclosure 12 of gas discharge tube 10.

Figure 5:
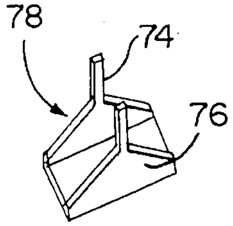
FIG. 5 is a perspective view of a ground clip.
Figure 7:
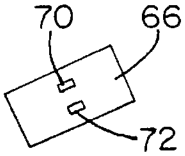
FIG. 7 is a perspective pictorial representation of the thermally sensitive insulation utilized between the gas discharge tube and the mounting clips.

FIG. 7 discloses the configuration of the FEP insulator 66. Two apertures 70 and 72 are provided in insulator 66 so that the fingers 74 and 76 of ground clip 78 (shown in FIG. 5) may come into electrically conductive contact with the metallic electrically conductive surface of the enclosure 12. Ground clip 78 is affixed to the conductive housing 38 in a conventional manner and thus, is in electrically conductive contact therewith and with the ground portion of connectors 40 and 42 and also, the connectors 44 and 46 affixed thereon completing the ground integrity of the system.

Figure 8:
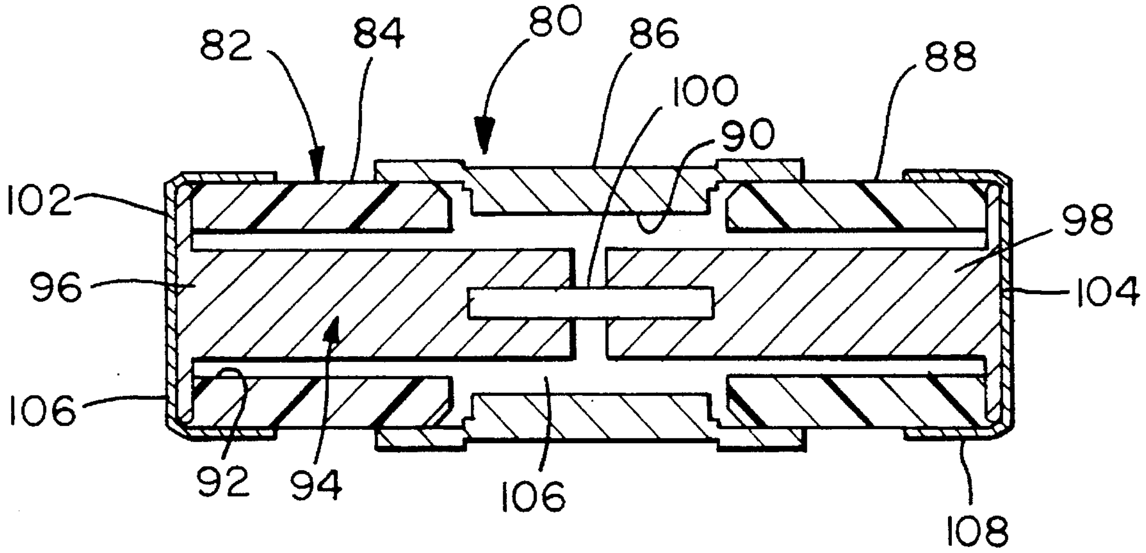
FIG. 8 is a cross-sectional view in elevation of an alternate embodiment of the gas discharge tube according to the principles of the invention.
Figure 9:
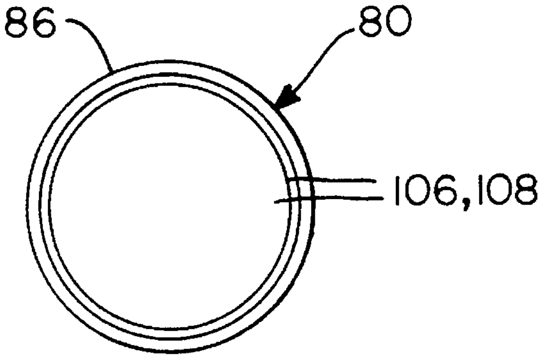
FIG. 9 is an end view in elevation of the device shown in FIG. 8.

FIGS. 8 and 9 show an alternative embodiment of the gas discharge tube 80, which includes an elongated hollow enclosure 82 that preferably is fabricated in three separate pieces. The enclosure 82 includes a first portion 84 preferably fabricated from an insulating material (ceramic), a second central electrically conductive portion 86, generally referred to as the ground terminal, and a third portion 88, which is identical to the first portion 84. Each of the three pieces is generally tubular shaped and hollow. The inner surface 90 of the conductive portion 86 may also be roughened in order to achieve more reliable performance of the gas discharge tube in a manner similar to that set forth with regard to FIG. 1.

Centrally located within the hollow opening 92 of the enclosure 82 is electrically conductive electrode 94 which is fabricated in three sections. The first and third sections 96 and 98 have the same structure and are connected together by an electrically conductive bridging pin 100 which forms the third section. Thus, electrically conductive contact is continuous from the first end 102 to the other end 104, via the bridging pin 100. End caps 106 and 108 provide the seal so that the gas 106 may be retained in the space provided between the electrically conductive electrode 94 and the enclosure 82. The end caps 106 and 108 are in electrically conductive contact with the conductive electrode 94, thus providing a continuous conducting medium from one end to the other, maintaining a continuous path therethrough.

Figure 6:
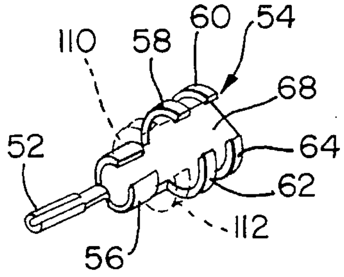
FIG. 6 is a perspective view of a mounting clip used to hold the gas discharge tube within the housing.
Figure 10:
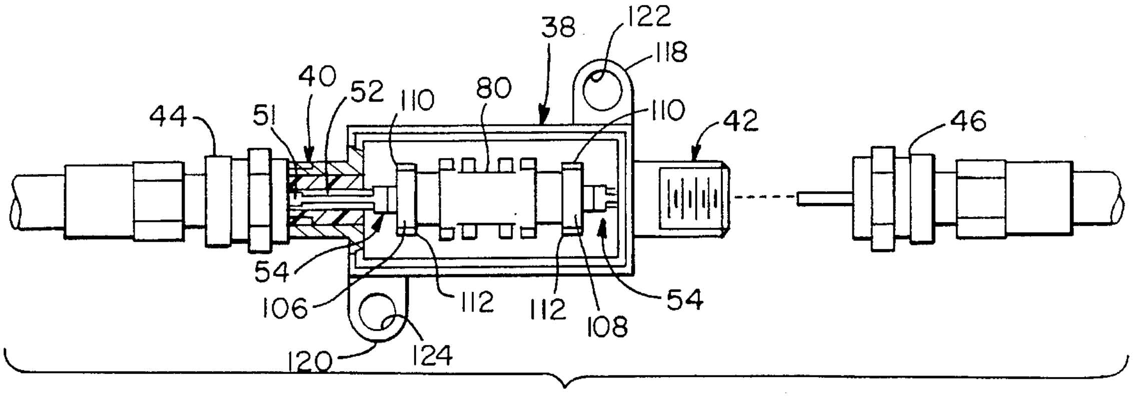
FIG. 10 is a top plan view with the cover removed, partially broken away, of the gas discharge tube as shown in FIG. 8, mounted in the housing.

FIG. 10 is a top plan view of the housing 38 having the alternative embodiment of the gas discharge tube 80 inserted therein and with one of the coaxial connectors 46 removed from the connector 42 on the housing 38. The other connector 44 is connected to the female connector 40 on the housing 38. The clip 54 shown in FIG. 6 is modified somewhat by replacing receptacle portion 56 with a pair of fingers 110 and 112 suitable for grasping the end caps 106 and 108 of the gas discharge tube 80. The remaining portion of clip 54 remains the same. Hereagain, an insulator 66 formed from a thermally sensitive material such as FEP is utilized to electrically insulate the end caps 106 and 108 from the electrically conductive material from which the clip 54 is fabricated.

Figure 11:
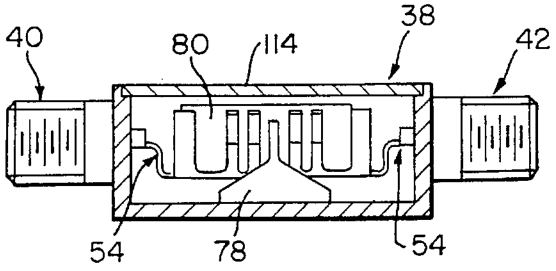
FIG. 11 is a pictorial representation, partially broken away, of the apparatus shown in FIG. 10.

FIG. 11 is a side view in elevation of the housing 38 partially in cross-section with the cover 114 in place to completely seal the housing 38. The ground clip 78 in FIG. 11 is identical to the ground clip 78 in FIG. 5.

Figure 12:
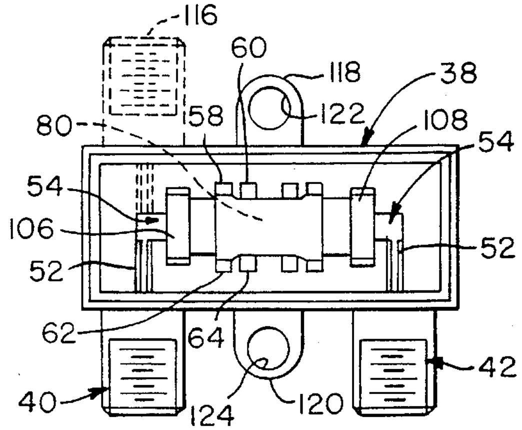
FIG. 12 is a top plan view with the cover removed of an alternative housing apparatus with the connectors appearing on different surfaces of the housing.
Figure 13:
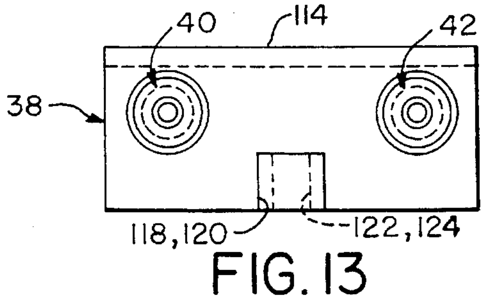
FIG. 13 is an end view in elevation of the housing apparatus shown in FIG. 12.

The surge arrestor shown in FIGS. 12 and 13 may utilize either gas discharge tube 10 or gas discharge tube 80, with the clip 54 being slightly modified from that shown in FIG. 6, since the receptacle portion 52 of clip 54 is bent at right angles so that it may accommodate female connectors 40 and 42 appearing on the same surface of the housing 38. Alternatively, a connector 116 may be placed on the opposite wall of the housing 38 for convenience, if desired, with the clip 54 being modified as necessary and shown in the broken lines. Mounting ears 118 and 120 with apertures 122 and 124 may be provided on the housing 38 to allow for mounting the housing 38 in various locations.

In operation, the parts of the gas discharge tube may be assembled and fired in a conventional manner sealing the gas within the enclosure. Thereafter, the assembly is placed in the housing utilizing the FEP insulator, mounting and ground clips so that the unit is ready for use in the field.

Figure 14:
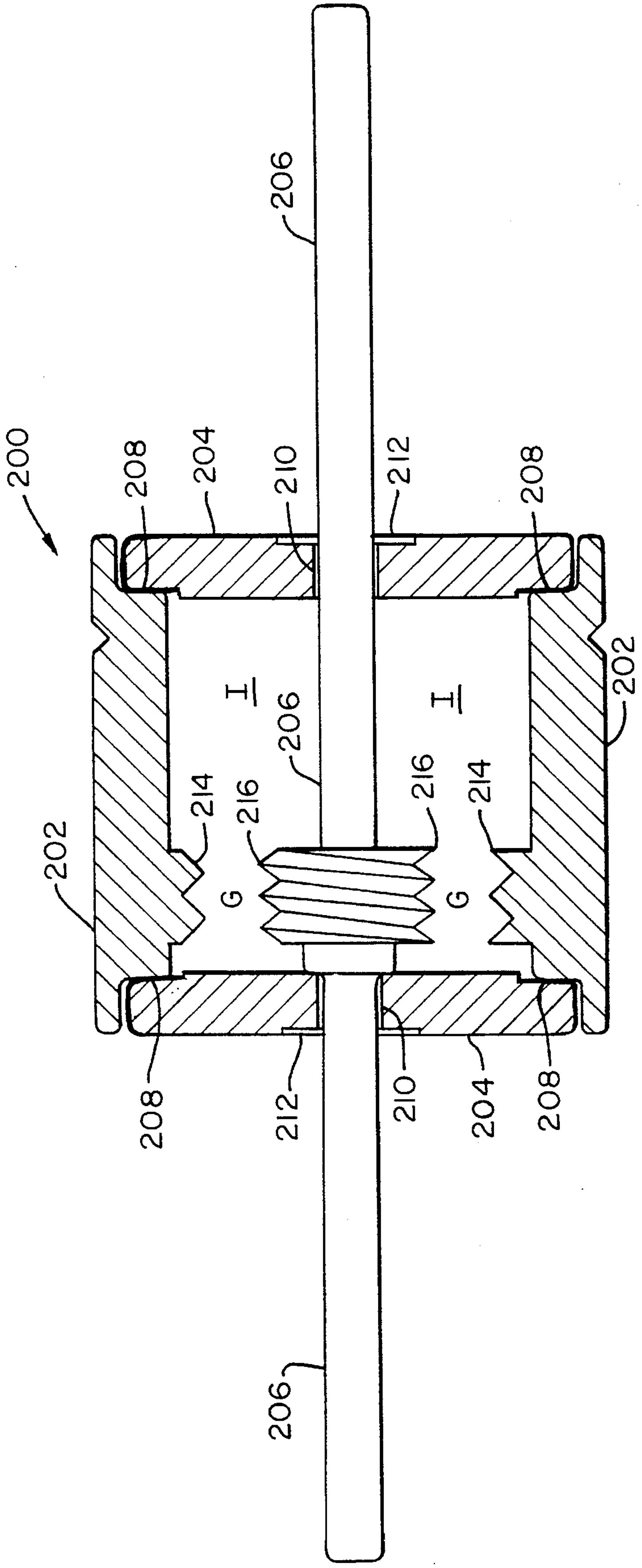
FIG. 14 is a cross-sectional view of another alternate embodiment of the gas discharge tube of the present invention.

FIG. 14 discloses another alternative embodiment of the gas discharge tube of the present invention which is suitable for use in a coaxial transmission line surge arrestor. The gas discharge tube 200 comprises a conductive housing 202, insulating ends 204 and a center conductor 206 extending through housing 202. The RF signal flows axially through the gas discharge tube 200. Although shown projecting beyond ends 204, center conductor 206 could terminate at ends 204 and external conductors could be attached thereto. As with the embodiment shown in FIG. 1, the insulating ends 204 are preferably formed from a ceramic material and seal the housing and an inert gas within the housing. In conventional gas discharge tubes the inert gas is a mixture of hydrogen and argon to provide a breakdown voltage of 250 to 350 volts DC. In a preferred embodiment of the present invention the inert gas is a mixture of neon and argon which provides a breakdown voltage of about 100 volts DC.

The insulating ends 204 are preferably metallized in the regions 208 where the ends contact the conductive housing 202. The insulating ends 204 are also preferably metallized in the regions 210 where the ends contact center conductor 206. It is also preferred that the insulating ends have annular recesses 212 in the exterior faces 205 thereof in the regions where conductor 206 projects through ends 204. These annular recesses are also preferably metallized.

The annular recesses facilitate the metallization step in the manufacturing operation. Thus, the entire outer surface of the insulating end 204 containing the annular recess can be metallized and the metallization can be removed in the area outside the annular recess by grinding down the outer surface of the insulating end.

As shown in FIG. 14, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, as with conventional gas discharge tubes, the surfaces 214 and 216 are preferably coated with a low work function material to reduce the breakdown voltage and enhance the firing characteristics of the gas discharge tube. The gas discharge occurs in the region "G" between surfaces 214 and 216. Region "G" is the active discharge region.

In addition to coating surfaces 214 and 216, it is preferable to employ "striping" in the form of radial graphite lines on the interior surface of the insulating end 204 adjacent the active discharge region "G." This "striping" helps to initiate the voltage breakdown.

As also shown in FIG. 14, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 14, the medium is an inert gas which has a dielectric constant of approximately one. Therefore, the impedance of the gas discharge tube varies between the insulating ends as the logarithm of the ratio D/d. As noted earlier, the insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G".

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ratio of the region "G" to the region "I" may be on the order of one to two.

Some typical dimensions for the miniature coaxial gas discharge tube 200 shown in FIG. 14 are: (1) overall length of center conductor 206—one inch; (2) length of conductive housing 202—0.32 inches; (3) outside diameter of gas discharge tube 200—0.33 inches; (4) diameter of center conductor 206—0.035 inches.

Figure 15A:
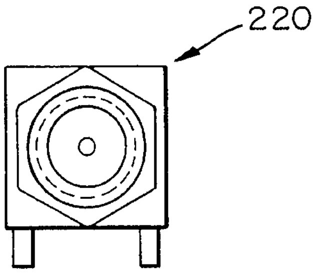
FIG. 15A is an end view of a printed circuit board coaxial connector embodying the gas discharge tube of the present invention.
Figure 15B:
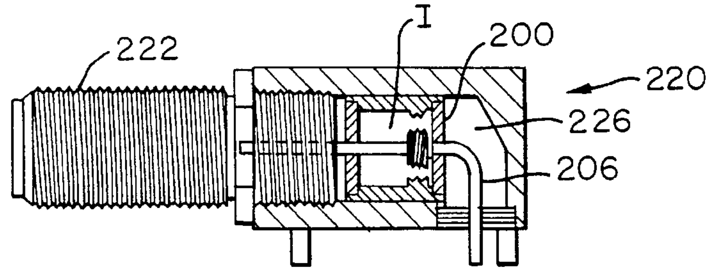
FIGS. 15B and 15C are cross-sectional views of two variations of the coaxial connector of FIG. 15A.
Figure 15C:
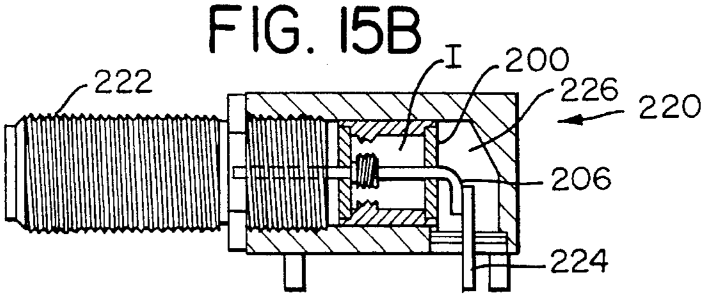

FIGS. 15A through 15C show a coaxial surge arrestor 220 which incorporates the gas discharge tube 200 of FIG. 14. Surge arrestor 220 is designed to connect between a coaxial transmission line using F-type coaxial connectors and a printed circuit board. Thus, one end 222 of surge arrestor 220 is threaded and is designed to receive a conventional male F-type coaxial connector, while the other ends has conductors projecting therefrom and is designed to be mounted on a printed circuit board or similar substrate.

In FIG. 15B the impedance matching section "I" of gas discharge tube 200 is located to the left of the gas discharge gap "G", whereas in FIG. 15C the impedance matching section "I" is located to the right of the gas discharge gap "G". In FIG. 15C the distance by which the center conductor 206 projects beyond the insulating end of gas discharge tube 200 may not be sufficient to permit connecting the surge arrestor to the printed circuit board, in which event an additional conductor 224 is employed which is electrically connected to center conductor 206.

As also shown in FIGS. 15B and 15C, the surge arrestor 220 has a cavity 226 located behind the gas discharge tube 200. This cavity can also be used for matching the impedance of the surge arrestor to that of the coaxial transmission line by appropriately dimensioning the cavity 226 and/or by filling the cavity with a material having a suitable dielectric constant.

Figure 16A:
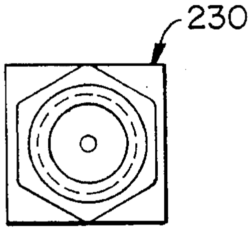
FIG. 16A is an end view of an in-line coaxial connector embodying the gas discharge tube of the present invention.
Figure 16B:
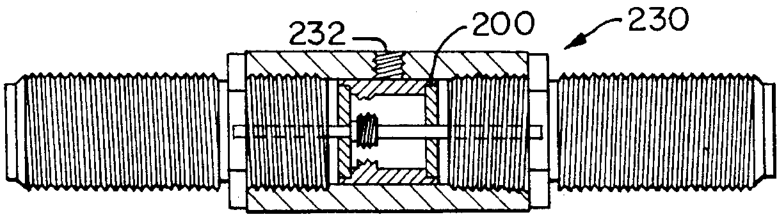
FIG. 16B is a cross-sectional view of the coaxial connector of FIG. 16A.

FIGS. 16A and 16B show another coaxial transmission line surge arrestor 230 which incorporates the gas discharge tube 200 of FIG. 14. The surge arrestor of FIGS. 16A and 16B is an in-line device designed to be connected between two coaxial transmission lines having male F-type coaxial connectors. The gas discharge tube 200 is secured within surge arrestor 230 by means of a set screw 232.

Figure 17A:
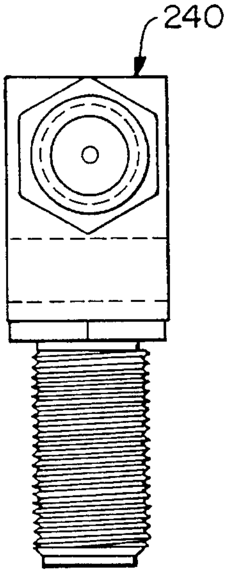
FIG. 17A is an end view of a right angle coaxial connector embodying the gas discharge tube of the present invention.
Figure 17B:
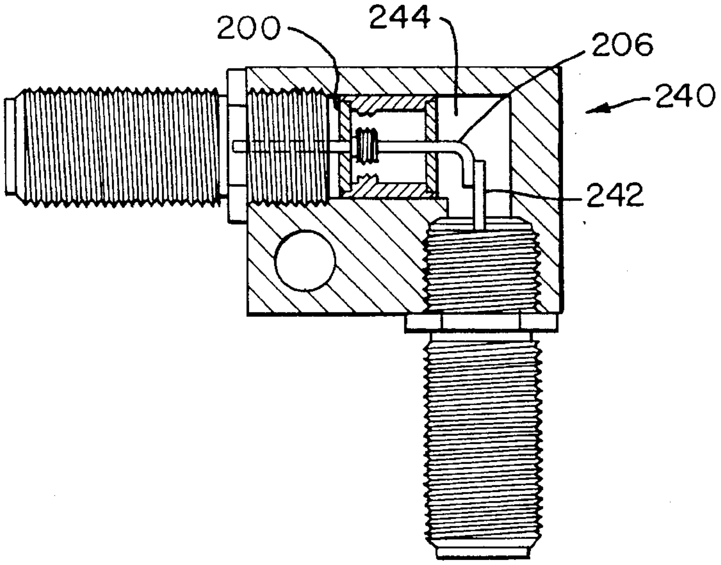
FIG. 17B is a cross-sectional view of the coaxial connector of FIG. 17A.

FIGS. 17A and 17B show another coaxial transmission line surge arrestor 240 which incorporates the gas discharge tube 200 shown in FIG. 14. The surge arrestor of FIGS. 17A and 17B is a right angle device designed to be connected between two coaxial transmission lines having male F-type coaxial connectors. As shown in FIG. 17B, the length of the center conductor 206 projecting from gas discharge tube 200 is insufficient and, therefore, it has been extended by electrically connecting a second center conductor 242 thereto. Surge arrestor 240 also has a cavity 206 which may be suitably dimensioned and/or filled with a dielectric material for matching the impedance of surge arrestor 240 to that of the coaxial transmission line.

Figure 18:
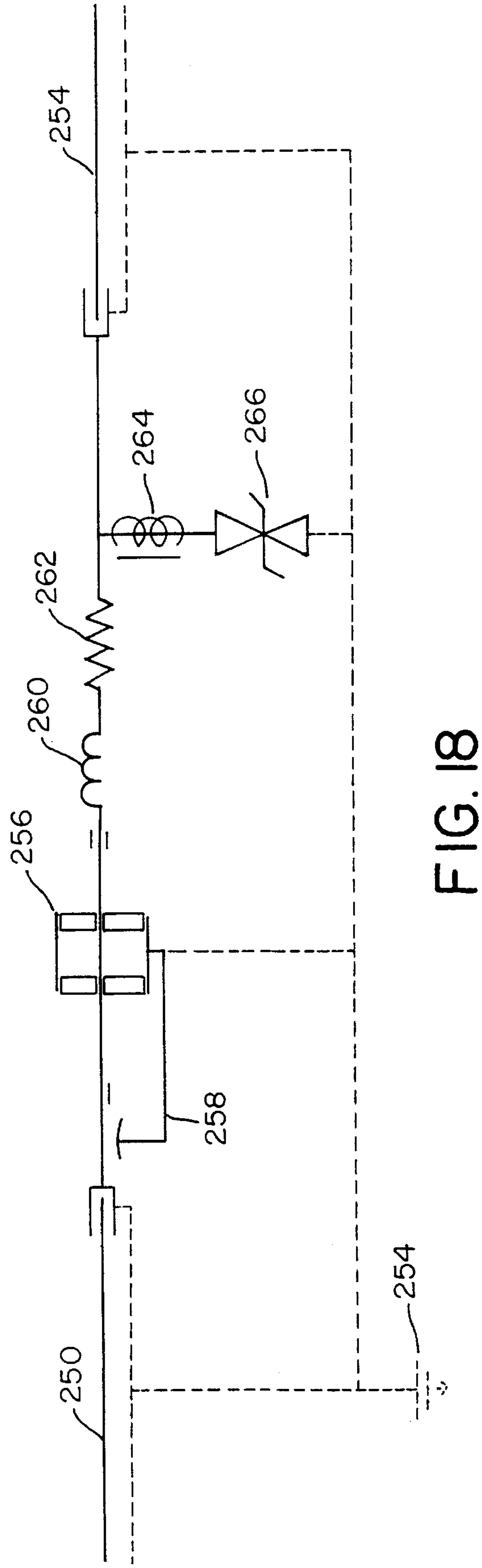
FIG. 18 is a schematic diagram of a coaxial surge arrestor in accordance with the present invention including current limiting and low voltage protection.

FIG. 18 is a schematic diagram of a coaxial transmission line surge arrestor system in accordance with the present invention. FIG. 18 shows an RF transmission line having an input 250, an output 252 and a ground 254. Located in series in the RF transmission line is a gas discharge tube 256 in accordance with the present invention. As can be seen from FIG. 18, the RF signal flows through the gas discharge tube 256 which may be any embodiment of the present invention including, without limitation, the embodiments 10, 80 and 200 shown, respectively, in FIGS. 1, 8 and. 14.

The schematic diagram of FIG. 18 shows the presence of a fail short protective device at 258 which may utilize a ground clip and FEP film as previously disclosed. Also shown is an inductor 260 and a resistor 262 for limiting the current which flows to the output 254 of the surge arrestor. In addition, a ferrite bead 264 and an avalanche diode 266 are connected between the center conductor and ground for low voltage protection. The ferrite bead 264 permits low frequency (e.g. 10 MHz and below) signals to go to ground but prevents high frequency (e.g. 50 MHz to 1 GHz) signals from going to ground. Avalanche diode 266 clamps low frequency signals to a voltage of, for example, five to ten volts.

Figure 19:
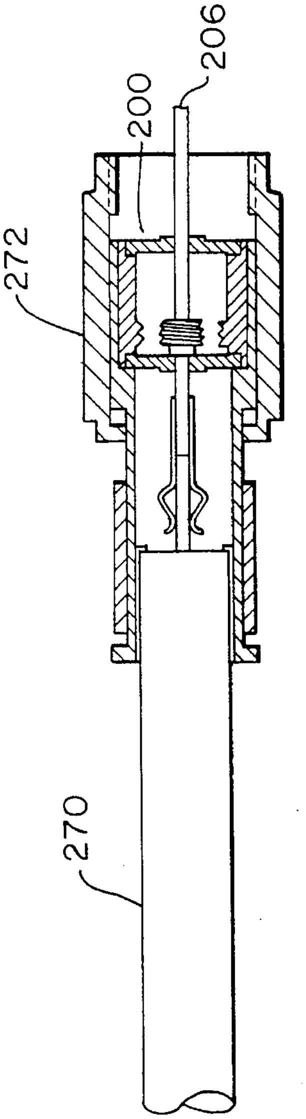
FIG. 19 is a cross-sectional view of a coaxial cable with a male coaxial connector incorporating the gas discharge tube of the present invention.

FIG. 19 shows another embodiment of the invention comprising a coaxial cable 270 having a male coaxial connector 272 attached thereto. Connector 272 contains gas discharge tube 200. The center conductor 206 of the gas discharge tube projects from the end of the male connector 272. The various parts of gas discharge tube 200 are as shown in FIG. 14 and described earlier.

Figure 20:
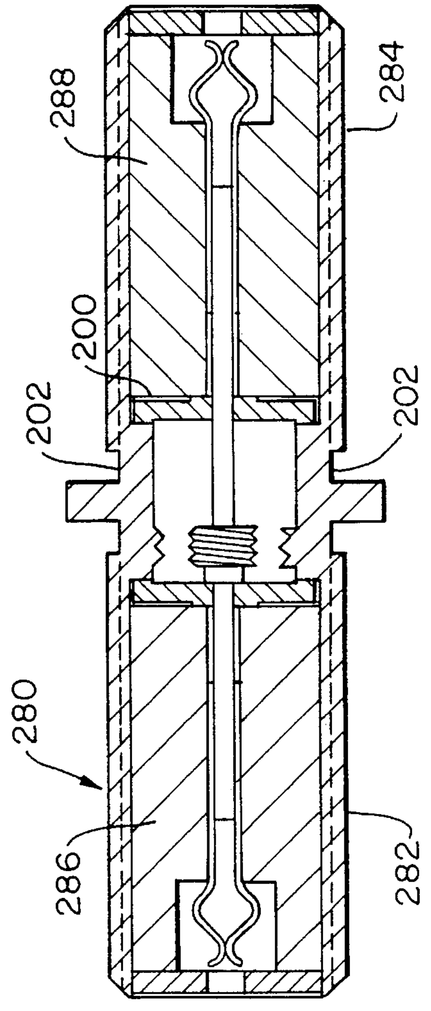
FIG. 20 is a cross-sectional view of a female-female coaxial connector having an integral surge arrestor.

FIG. 20 shows another embodiment of the invention which comprises a surge arrestor 280 having back-to-back female coaxial connectors 282 and 284. A gas discharge tube 200 is located between coaxial connectors 282 and 284. The embodiment shown in FIG. 20 differs from the embodiments shown in FIGS. 15B, 15C, 16B, 17B and 19 in that the conductive housing 202 is an integral part of the conductive outer body of the coaxial surge arrestor. As also shown in FIG. 20, the female coaxial connectors 282 and 284 have solid dielectric materials 286 and 288 located on either side of the gas discharge tube 200 which positions the gas discharge tube in the middle of the coaxial surge arrestor 280.

It will be understood that various changes in the details, materials, arrangement of parts and operating conditions which have been herein described and illustrated in order to explain the nature of the invention may be made by those skilled in the art without departing from the principles and scope of the instant invention.

What is claimed is:

1. A surge arrestor for coaxial transmission lines comprising:

(a) a hollow conductive body having two coaxial connectors that are axially aligned with each other;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission, and (5) the diameter of said conductor being varied along at least a portion of the length of said conductor within said housing for matching the impedance of said surge arrestor to that of said transmission line.

2. A surge arrestor for coaxial transmission lines comprising:

(a) a hollow conductive body having two coaxial connectors that are disposed at right angles to each other;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission; and (5) the diameter of said conductor being varied along at least a portion of the length of said conductor within said housing for matching the impedance of said surge arrestor to that of said transmission line.

3. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (c) means for mounting said surge arrestor on a printed circuit board.

4. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (c) a ground clip electrically connected to said conductor of said gas discharge tube and a thermally sensitive insulator which normally electrically insulates said ground clip from said hollow conductive housing but which permits an electrical connection between said ground clip, said conductive housing and said conductor when said gas discharge tube overheats.

5. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, said inert gas comprising a mixture of neon and argon, (4) a conductor extending through said housing, said conductor having a longitudinal axis oriented in a direction parallel to the direction of signal transmission, and (5) the diameter of said conductor being varied along at least a portion of the length of said conductor within said housing for matching the impedance of said surge arrestor to that of said transmission line.

6. A surge arrestor for coaxial transmission lines comprising:

(a) hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, said insulating ends being formed from a ceramic material, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (6) wherein the portions of said ceramic insulating ends that contact said conductive housing are metallized.

7. The surge arrestor of claim 6 wherein the portions of said ceramic insulating ends that contact said conductor are also metallized.

8. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (6) wherein the exterior surface of said conductor and the interior surface of said housing are symmetrical around said longitudinal axis of said conductor.

9. The surge arrestor of claim 8 wherein the outer diameter of said conductor is reduced for a portion of the length of said conductor within said housing.

10. A coaxial connector with an integral coaxial transmission line surge arrestor comprising:

(a) a hollow conductive body having at least one coaxial connector mounted thereon;

(b) a gas discharge tube adapted for connection in series with said transmission line such that siqnal flow is through said gas discharge tube, said gas discharge tube comprising (1) a hollow conductive housing which is an integral part of said conductive body, (2) insulating ends adapted to seal said housing, said insulating ends being formed from a ceramic material, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (6) wherein the portions of said ceramic insulating ends that contact said conductive housing are metallized.

11. The coaxial connector of claim 10 wherein the portions of said ceramic insulating ends that contact said conductor are also metallized.

12. A coaxial connector with an integral coaxial transmission line surge arrestor comprising:

(a) a hollow conductive body having at least one coaxial connector mounted thereon;

(b) a gas discharge tube adapted for connection in series with said transmission line such that signal flow is through said gas discharge tube, said gas discharge tube comprising (1) a hollow conductive housing which is an integral part of said conductive body, (2) insulating ends adapted to seal said housing, (3) an inert gas sealed in said housing, (4) a conductor extending through said housing, said conductor having a longitudinal axis oriented in a direction parallel to the direction of signal transmission; and (5) the diameter of said conductor is varied along at least a portion of the length of said conductor for matching the impedance of said surge arrestor to that of said transmission line.

13. The coaxial connector of claim 12 wherein said insulating ends are formed from a ceramic material.

14. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission; and (5) the diameter of said conductor is varied along at least a portion of the length of said conductor for matching the impedance of said surge arrestor to that of said transmission line.

15. The surge arrestor of claim 14 wherein said insulating ends are formed from a ceramic material.

16. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (6) wherein at least a portion of the interior surface of said housing and at least a portion of the exterior surface of said conductor are roughened for concentrating electric fields and facilitating reliable operation of said gas discharge tube.

17. The surge arrestor of claim 16 wherein said surface roughening takes the form of threads or serrations.

18. The surge arrestor of claim 16 wherein at least one of said insulating ends has radial striping to further facilitate reliable operation of said gas discharge tube.

19. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow housing fabricated from two electrically insulating members and an electrically conductive member located between said two insulating members, (2) conductive ends adapted to seal said housing, (3) an inert gas sealed in said housing, (4) a center conductor extending through said housing, said conductor having a longitudinal axis oriented in a direction parallel to the direction of signal transmission;

(5) at least a portion of the interior surface of said conductive housing member and at least a portion of the exterior surface of said center conductor being roughened for conducting electric fields and facilitating reliable operation of said gas discharge tube; and (6) wherein the diameter of said conductor is varied along at least a portion of said conductor for matching the impedance of said surge arrestor to that of said transmission line.

20. The surge arrestor of claim 14 wherein the exterior surface of said conductor and the interior surface of said housing are symmetrical around said longitudinal axis of said conductor.

21. The surge arrestor of claim 19 wherein said surface roughening takes the form of threads or serrations.

22. A coaxial connector with an integral coaxial transmission line surge arrestor comprising:

(a) a hollow conductive body having at least one coaxial connector mounted thereon;

(b) a gas discharge tube adapted for connection in series with said transmission line such that signal flow is through said gas discharge tube, said gas discharge tube comprising (1) a hollow conductive housing which is an integral part of said conductive body, (2) insulating ends adapted to seal said housing, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (6) wherein at least a portion of the interior surface of said housing and at least a portion of the exterior surface of said conductor are roughened for concentrating electric fields and facilitating reliable operation of said gas discharge tube.

23. The coaxial connector of claim 22 wherein said surface roughening takes the form of threads or serrations.

24. The coaxial connector of claim 22 wherein at least one of said insulating ends has radial striping to further facilitate reliable operation of said gas discharge tube.

25. A coaxial connector with an integral coaxial transmission line surge arrestor comprising:

(a) a hollow conductive body having at least one coaxial connector mounted thereon;

(b) a gas discharge tube adapted for connection in series with said transmission line such that signal flow is through said gas discharge tube, said gas discharge tube comprising (1) a hollow conductive housing which is an integral part of said conductive body, (2) insulating ends adapted to seal said housing, (3) an inert gas sealed in said housing, (4) a conductor extending through said housing, said conductor having a longitudinal axis oriented in a direction parallel to the direction of signal transmission, (5) the diameter of said conductor being varied along at least a portion of the length of said conductor within said housing for matching the impedance of said surge arrestor to that of said transmission line, and (6) wherein the exterior surface of said conductor and the interior surface of said housing are symmetrical around said longitudinal axis of said conductor.

26. The coaxial connector of claim 25 wherein the outer diameter of said conductor is reduced for a portion of the length of said conductor within said housing.

27. The coaxial connector of claim 25 wherein the interior of said housing is divided into an active discharge region and an impedance matching region and the relative proportions of said regions are chosen for matching the impedance of said surge arrestor to that of said transmission line.

28. The coaxial connector of claim 27 wherein the ratio of said impedance matching region to said gas discharge region is on the order of one to one.

29. The coaxial connector of claim 27 wherein the ratio of said impedance matching region to said gas discharge region is on the order of two to one.

30. A miniature gas discharge tube suitable for use in coaxial transmission line surge arrestors and adapted for connection in series with said transmission line such that signal flow is through said gas discharge tube, the gas discharge tube comprising:

(a) a hollow conductive housing;

(b) a pair of insulating ends for sealing said housing;

(c) an inert gas sealed in said housing;

(d) a center conductor extending through said housing, said center conductor having a longitudinal axis which is oriented in a direction parallel to the direction of signal transmission;

(e) said conductive housing having an interior surface which is symmetric with respect to said longitudinal axis and said center conductor having an exterior surface which is symmetric with respect to said longitudinal axis; and (f) the ratio of the inner diameter D of said conductive housing to the outer diameter d of said center conductor being varied along at least a portion of the length of said conductor for matching the impedance of said gas discharge tube to the impedance of said coaxial transmission line.

31. The gas discharge tube of claim 30 wherein said inert gas comprises a mixture of neon and argon.

32. The gas discharge tube of claim 30 wherein the ratio D/d varies by at least a factor of two.

33. The gas discharge tube of claim 31 wherein said gas discharge tube has a breakdown voltage of on the order of 100 volts DC.

34. The gas discharge tube of claim 32 wherein the ratio D/d varies by at least a factor of three.

35. The gas discharge tube of claim 30 wherein at least a portion of said interior surface of said conductive housing and at least a portion of said exterior surface of said center conductor are roughened for concentrating electric fields and facilitating reliable operation of said gas discharge tube.

36. The gas discharge tube of claim 35 wherein said surface roughening takes the form of threads or serrations.

37. The gas discharge tube of claim 35 wherein at least one of said insulating ends has radial striping for further facilitating reliable operation of said gas discharge tube.

38. The gas discharge tube of claim 30 wherein said insulating ends are formed from a ceramic material.

39. The gas discharge tube of claim 38 wherein the portions of said ceramic insulating ends that contact said conductive housing are metallized.

40. The gas discharge tube of claim 39 wherein the portions of said ceramic ends that contact said center conductor are also metallized.

41. The gas discharge tube of claim 40 wherein the exterior surfaces of said ceramic ends have annular recesses in the regions where said center conductor projects from said ceramic ends.

42. A miniature gas discharge tube suitable for use in coaxial transmission line surge arrestors and adapted for connection in series with said transmission line such that signal flow is through said gas discharge tube, the gas discharge tube comprising:

(a) a hollow conductive housing;

(b) a pair of insulating ends for sealing said housing;

(c) an inert gas sealed in said housing;

(d) a center conductor extending through said housing, said center conductor having a longitudinal axis which is oriented in a direction parallel to the direction of signal transmission;

(e) said conductive housing having an interior surface which is symmetric with respect to said longitudinal axis and said center conductor having an exterior surface which is symmetric with respect to said longitudinal axis; and (f) the interior of said housing being divided into an active discharge region and an impedance matching region, the relative proportions of said regions being chosen for matching the impedance of said gas discharge tube to that of a coaxial transmission line and the diameter of said conductor is varied along at least a portion of the length of said conductor.

43. The gas discharge tube of claim 42 wherein the proportion of said impedance matching region to said active discharge region is on the order of one to one.

44. The gas discharge tube of claim 42 wherein the proportion of said impedance matching region to said active discharge region is on the order of two to one.

45. The gas discharge tube of claim 42 wherein said inert gas comprises a mixture of neon and argon.

46. The gas discharge tube of claim 45 wherein said gas discharge tube has a breakdown voltage on the order of 100 volts DC.

47. The gas discharge tube of claim 42 wherein at least a portion of the interior surface of said housing and at least a portion of the exterior surface of said center conductor are roughened for concentrating electric fields and facilitating reliable operation of said gas discharge tube.

48. The gas discharge tube of claim 47 wherein said surface roughening takes the form of threads or serrations.

49. The gas discharge tube of claim 47 wherein at least one of said insulatings has radial striping for further facilitating reliable operation of said gas discharge tube.

50. The gas discharge tube of claim 41 wherein said insulating ends are formed from a ceramic material.

51. The gas discharge tube of claim 50 wherein the portions of said ceramic insulating ends that contact said conductive housing are metallized.

52. The gas discharge tube of claim 51 wherein the portions of said insulating ends that contact said center conductor are also metallized.

53. A method of protecting a coaxial transmission line with a surge arrestor comprising the steps of:

(a) electrically connecting a first conductor of a first transmission line section to a hollow conductive housing having a pair of insulating ends for sealing said housing and an inert gas therein;

(b) electrically connecting a second conductor of said first transmission line section to a first end of a center conductor extending through said housing, said center conductor having a longitudinal axis which is oriented in a direction parallel to the direction of signal transmission, said conductive housing, said insulating ends and said center conductor forming a gas discharge tube, the interior surface of said conductive housing and the exterior surface of said center conductor are symmetric about said longitudinal axis and the ratio of the inner diameter D of said conductive housing to the outer diameter d of said center conductor is varied along at least a portion of the length of said center conductor for matching the impedance of said gas discharge tube to the impedance of said transmission line; and (c) passing a signal from said first transmission line section through said gas discharge tube.

54. The method of claim 53 wherein the ratio D/d varies by at least a factor of two.

55. The method of claim 54 wherein the ratio D/d varies by at least a factor of three.

56. The method of claim 53 further comprising the steps of:

(a) electrically connecting a first conductor of a second transmission line section to said conductive housing;

(b) electrically connecting a second conductor of a second transmission line section to a second end of said center conductor; and (c) passing a signal from said first transmission line section through said gas discharge tube and to said second transmission line section.

57. The method of claims 53 or 56 wherein at least a portion of the interior surface of said conductive housing and at least a portion of the exterior of surface of said center conductor are roughened to concentrate electric fields for facilitating reliable operation of said gas discharge tube.

58. The method of claims 53 or 56 wherein said insulating ends of said gas discharge tube are ceramic.

59. The method of claims 53 or 56 wherein said insulating ends of said gas discharge tube are ceramic and said ceramic ends are metallized in the regions where said ceramic ends contact said conductive housing and said center conductor.

60. The method of claims 53 or 56 wherein at least a portion of the interior surface of said conductive housing and at least a portion of the exterior of surface of said center conductor are roughened to concentrate electric fields for facilitating reliable operation of said gas discharge tube and said surface roughening takes the form of threads or serrations.

61. The method of claims 53 or 56 wherein the interior of said housing is divided into an active discharge region and an impedance matching region and the relative proportions of said regions are chosen for matching the impedance of said gas discharge tube to that of said coaxial transmission line.

62. The method of claim 61 wherein said coaxial transmission line has an impedance of about 50 ohms and the proportion of said impedance matching region to said active discharge region is on the order of one to one.

63. The method of claim 61 wherein said coaxial transmission line has an impedance of about 12 ohms and the proportion of said impedance matching region to said active discharge region is on the order of two to one.

64. A surge arrestor for coaxial transmission lines comprising:

(a) a hollow conductive body having at least one coaxial connector mounted thereon;

(b) a gas discharge tube located in said hollow conductive body and adapted for connection in series with said transmission line such that signal flow is through said gas discharge tube, said gas discharge tube comprising (1) a hollow conductive housing, said housing being in electrical contact with said conductive body, (2) insulating ends adapted to seal said housing, (3) an inert gas sealed in said housing, (4) a center conductor extending through said housing, said center conductor having a longitudinal axis oriented in a direction parallel to the direction of signal transmission, the interior surface of said housing and the exterior surface of said center conductor being symmetric with respect to said longitudinal axis; and (5) the ratio of the inner diameter D of the conductive housing to the outer diameter d of the center conductor is varied along at least a portion of said conductor within said housing for matching the impedance of the surge arrestor to the impedance of the transmission line.

65. The surge arrestor of claim 64 wherein the ratio D/d varies by at least a factor of two.

66. The surge arrestor of claim 65 wherein the ratio D/d varies by at least a factor of 3.

67. The surge arrestor of claim 64 wherein said inert gas comprises a mixture of neon and argon.

68. The surge arrestor of claim 67 wherein said gas discharge tube has a breakdown voltage of on the order of 100 volts DC.

69. The surge arrestor of claim 64 wherein said hollow conductive body includes a hollow recess external to said gas discharge tube which is dimensioned for matching the impedance of said surge arrestor to that of said coaxial transmission line.

70. The surge arrestor of claim 69 wherein said recess is at least partially filled with a dielectric material other than air.

71. The surge arrestor of claim 64 wherein at least a portion of the interior surface of said housing and at least a portion of the exterior surface of said center conductor are roughened for concentrating electric fields and facilitating reliable operation of said gas discharge tube.

72. The surge arrestor of claim 71 wherein said surface roughening takes the form of threads or serrations.

73. The surge arrestor of claim 71 wherein at least one of said insulating ends has radial striping to further facilitate reliable operation of said gas discharge tube.

74. The surge arrestor of claim 64 wherein the interior of said housing is divided into an active discharge region and an impedance matching region and the relative proportions of said regions are chosen for matching the impedance of said gas discharge tube to that of said coaxial transmission line.

75. The surge arrestor of claim 74 wherein the proportion of said impedance matching region to said active discharge region is on the order of one to one.

76. The surge arrestor of claim 74 wherein the proportion of said impedance matching region to said active discharge region is on the order of two to one.

77. The surge arrestor of claim 64 wherein said insulating ends are formed from a ceramic material.

78. The surge arrestor of claim 77 wherein said ceramic ends are metallized in the regions where they contact said conductive housing and said center conductor.

79. The surge arrestor of claim 78 wherein at least one of said ceramic ends has radial striping to facilitate reliable operation of said gas discharge tube.

80. A coaxial transmission line surge arrestor system comprising:

(a) a first transmission line section;

(b) a second transmission line section; and (c) a gas discharge tube connected in series between said first and second transmission line sections such that signal flow is through said gas discharge tube, said gas discharge tube comprising (1) a hollow conductive housing, (2) insulating ends adapted to seal said housing, (3) an inert gas sealed in said housing, (4) a center conductor extending through said housing, said conductor having a longitudinal axis oriented in a direction parallel to the direction of signal transmission; and (5) exterior surface of said center conductor and the interior surface of said housing are symmetric about said longitudinal axis and the ratio of the inner diameter of the conductive housing to the outer diameter of the center conductor is varied along at least portion of said conductor within said housing for matching the impedance of said gas discharge tube to the impedance of said coaxial transmission line.

81. A system according to claim 80 further including both current limiting and low voltage protection.

82. A system according to claim 80 further including both current limiting and fail short protection.

83. A system according to claim 82 further including low voltage protection.

84. A system according to claim 80 further including low voltage protection.

85. A system according to claim 80 further including fail short protection which connects said center conductor to ground in the event said surge arrestor overheats.

86. A system according to claim 85 wherein said fail short protection includes a thermally sensitive material.

87. A system according to claim 86 wherein said thermally sensitive material is FEP.

88. A system according to claim 80 further including current limiting protection.

89. A system according to claim 84 wherein said current limiting protection comprises a resistance electrically connected in series with said center conductor.

90. A system according to claim 88 wherein said current limiting protection comprises an inductance electrically connected in series with said center conductor.

91. A system according to claim 88 wherein said low voltage protection comprises an avalanche diode electrically connected between said center conductor and ground.

92. A system according to claim 91 wherein said low voltage protection further includes a ferrite bead electrically connected in series with said avalanche diode.

93. A system according to claims 88, 85 or 84 wherein the interior of said housing is divided into an active discharge region and an impedance matching region and the relative proportions of said regions are chosen for matching the impedance of said gas discharge tube to the impedance of said coaxial transmission line.

94. A system according to claims 88, 85 or 84 wherein at least a portion of the interior surface of said housing and at least a portion of the exterior surface of said center conductor are roughened for concentrating electric fields and facilitating reliable operation of said gas discharge tube and said surface roughening takes the form of threads or serrations.

95. The system according to claim 94 wherein at least one of said insulating ends includes stripping to further facilitate reliable operation of said gas discharge tube.

* * * * *